(12) United States Patent
Jolley et al.

(10) Patent No.: US 9,193,830 B2
(45) Date of Patent: Nov. 24, 2015

(54) LOW-MELT POLY(AMIC ACIDS) AND POLYIMIDES AND THEIR USES

(71) Applicant: The United States of America as Represented by the Administrator of the National Aeronautics and Space Administration, Washington, DC (US)

(72) Inventors: Scott T. Jolley, Titusville, FL (US); Tracy L. Gibson, Melbourne, FL (US); Martha K. Williams, Titusville, FL (US); Clyde F. Parrish, Trinity, FL (US); Steven L. Parks, Rockledge, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/093,680

(22) Filed: Dec. 2, 2013

(65) Prior Publication Data

US 2015/0152225 A1    Jun. 4, 2015

Related U.S. Application Data

(62) Division of application No. 13/033,085, filed on Feb. 23, 2011, now Pat. No. 8,623,253.

(60) Provisional application No. 61/308,648, filed on Feb. 26, 2010, provisional application No. 61/308,664, filed on Feb. 26, 2010, provisional application No. 61/308,672, filed on Feb. 26, 2010.

(51) Int. Cl.
| | |
|---|---|
| *C08G 73/10* | (2006.01) |
| *B29C 73/02* | (2006.01) |
| *C08L 79/08* | (2006.01) |
| *C09D 179/08* | (2006.01) |

(Continued)

(52) U.S. Cl.
CPC ............ *C08G 73/1082* (2013.01); *B29C 73/02* (2013.01); *C08G 73/106* (2013.01); *C08G 73/1046* (2013.01); *C08G 73/1053* (2013.01); *C08G 73/1075* (2013.01); *C08L 79/08* (2013.01); *C09D 179/08* (2013.01); *H01B 3/305* (2013.01); *H01B 3/306* (2013.01); *H01B 13/0016* (2013.01); *H01B 13/06* (2013.01); *H02G 1/16* (2013.01); *B29C 73/10* (2013.01); *B29C 73/12* (2013.01); *Y10T 428/31681* (2015.04)

(58) Field of Classification Search
None
See application file for complete search history.

(56) References Cited

U.S. PATENT DOCUMENTS 3,920,768 A * 11/1975 Kwiatkowski ............... 525/421
4,189,560 A *  2/1980 Roth et al. .................... 526/259

(Continued)

OTHER PUBLICATIONS

Andrea D. Bowens "Synthesis and Characterization of Poly(Siloxane Imide) Block Copolymers and End-Functional Polyimides for Interphase Applications" Dissertation for Doctor of Philosophy, Virginia Tech, 1999, 271 pages.*

*Primary Examiner* — Robert S Loewe
(74) *Attorney, Agent, or Firm* — Michelle L. Ford; Hugh McTavish

(57) ABSTRACT

Provided are low-melt polyimides and poly(amic acids) (PAAs) for use in repair of electrical wire insulation, flat or ribbon wire harnesses, and flat surfaces comprised of high-performance polymers such as inflatables or solar panels applications. Also provided are methods and devices for repair of electrical insulation.

18 Claims, 2 Drawing Sheets

(51) Int. Cl.
*H02G 1/16* (2006.01)
*H01B 3/30* (2006.01)
*H01B 13/00* (2006.01)
*H01B 13/06* (2006.01)
*B29C 73/10* (2006.01)
*B29C 73/12* (2006.01)

(56) References Cited

U.S. PATENT DOCUMENTS

| | | | | |
|---|---|---|---|---|
| 4,510,272 A | * | 4/1985 | Loszewski | 523/400 |
| 4,586,997 A | * | 5/1986 | Lee | 525/426 |
| 5,149,760 A | * | 9/1992 | Serafini et al. | 528/353 |
| 5,194,565 A | * | 3/1993 | McGrath et al. | 528/167 |
| 5,348,830 A | | 9/1994 | Sacripante | |
| 5,411,829 A | * | 5/1995 | Sacripante et al. | 430/109.5 |
| 5,411,831 A | * | 5/1995 | Sacripante et al. | 430/109.5 |
| 5,413,888 A | | 5/1995 | Sacripante et al. | |
| 5,552,254 A | | 9/1996 | Mychajlowsky et al. | |
| 5,670,564 A | | 9/1997 | Gagne et al. | |
| 5,760,165 A | * | 6/1998 | Dao et al. | 528/322 |
| 5,830,945 A | | 11/1998 | Gagne et al. | |
| 6,184,333 B1 | | 2/2001 | Gray | |
| 6,531,568 B1 | * | 3/2003 | Shibuya et al. | 528/170 |
| 6,611,046 B2 | | 8/2003 | Yang | |
| 6,884,854 B2 | * | 4/2005 | Schoenfeld et al. | 525/524 |
| 2003/0057601 A1 | * | 3/2003 | Reitz et al. | 264/239 |
| 2004/0225026 A1 | * | 11/2004 | Mizori et al. | 522/99 |
| 2006/0210819 A1 | * | 9/2006 | Dueber | 428/474.4 |
| 2009/0130432 A1 | * | 5/2009 | Fujii et al. | 428/327 |
| 2010/0029893 A1 | * | 2/2010 | Ohkido et al. | 528/317 |
| 2011/0212334 A1 | * | 9/2011 | Jolley et al. | 428/458 |

* cited by examiner

LOW-MELT POLY(AMIC ACIDS) AND POLYIMIDES AND THEIR USES

CROSS-REFERENCE TO RELATED APPLICATIONS

This application is a divisional application claiming the benefit of U.S. patent application Ser. No. 13/033,085 filed on Feb. 23, 2011, which further claims the benefit of priority under 35 U.S.C. §119(e) to U.S. Provisional Application Ser. No. 61/308,648, filed Feb. 26, 2010; U.S. Provisional Application Ser. No. 61/308,664, filed Feb. 26, 2010; and U.S. Provisional Application Ser. No. 61/308,672, filed Feb. 26, 2010; the contents of which are incorporated herein by reference.

ORIGIN OF THE INVENTION

The invention described herein was made in the performance of work under a NASA contract and by employees of the United States Government and is subject to the provisions of Public Law 96-517 (35 U.S.C. §202) and may be manufactured and used by or for the Government for governmental purposes without the payment of any royalties thereon or therefor.

BACKGROUND OF THE INVENTION

High-performance polyimide materials have been used for many years as insulating covers on electrical wiring and other aerospace applications because of their excellent electrical properties, chemical resistance, and high heat performance. In wiring applications, over time this type of polyimide insulation usually undergoes slow degradation due to polymer chain breakdown via hydrolysis initiated by the presence of water vapor. Many older military and commercial aircraft, as well as spacecraft such as the Space Shuttle have miles of electrical wire coated with polyimide insulation. As this insulation ages, it becomes much more brittle and susceptible to damage from mechanical and electrical stresses. Past experience has shown that replacement of damaged wires is both very difficult and not cost effective when compared to repairing such wiring.

Due to the chemical inertness of polyimide wire insulation, present repair techniques involve the wrapping of the damaged wire in multiple passes with tapes of materials such as TEFLON or other plastics and tying each end of the tape wrap to secure it in place. Another method for repairing damaged wire involves simply enclosing the damaged area with a low softening "clam-shell" shaped piece of repair polymer and "shrink-wrapping" the repair material onto the damaged area. Neither of these methods is considered hermetic or permanent in forming a close, intimate bond between the repair material and the damaged polyimide insulation and the repaired wire typically needs to be replaced over time.

New and better materials for repairing wire insulation are needed.

SUMMARY OF THE INVENTION

The inventors have developed several low-melt polymers, particularly polyimides, as well as poly(amic acids) (PAAs) that readily imidize to polyimides, that are useful in repairing wire insulation. These polymers have also been shown to be useful in the repair of other substrates, including flat surfaces, in coating metal substrates, including dip coating, and in the fabrication of extrudable or moldable polymers for the manufacture of high-performance parts. Most polyimides in wire insulation are thermoset polymers that have no melting temperature (that is, as the temperature is raised they eventually decompose before melting) or a very high melting temperature in excess of 400° C. The low-melt polymers of the invention can be applied as a repair patch, repair sleeve, or repair layer over polyimide wire insulation or other damaged surfaces made of polyimide or other high-performance or engineered polymers. With mild heating, the repair material can be made to melt or soften and thereby conform to the surface to be repaired. These repair films can also flow into any crack or defect in the polyimide insulation or surface to be repaired and make intimate contact with the substrate, resulting in a hermetic or permanent repair. With cooling, this polymer then forms a solidified polymer layer tightly bound to the original insulation layer or substrate. In some embodiments, the low-melt polymer also interacts with the original polyimide insulation or substrate to physically bond with the substrate. The physical bonding can be by polymer chain mixing between the repair layer and the substrate, or in some cases by chemical cross-linking to the substrate. It thereby forms an even tighter adhesion with the insulation or substrate resulting in a hermetic or "permanent" repair. The mild heating needed to melt the low-melt polymer can be applied externally and manually to facilitate the repair of the wire or other substrate.

Some embodiments of the invention involve novel polymers.

One embodiment of the invention provides a method of repairing a substrate comprising: (a) obtaining a substrate having continuous or discontinuous layer of a low-melt polymer outside of and in contact with the substrate, or applying a continuous or discontinuous (e.g., a patch) layer of a low-melt polymer to a substrate; (b) heating the layer of a low-melt polymer to a first temperature effective to melt the low-melt polymer to spread it into cracks or deformations that may exist or have formed in the substrate; and (c) heating the layer of a low-melt polymer to a second temperature effective to cross-link the low-melt polymer and to repair the cracks or deformations in the substrate; wherein the low-melt polymer comprises a poly(amic acid) (PAA) or a polyimide. The step of obtaining a substrate having continuous or discontinuous layer of a low-melt polymer outside of and in contact with the substrate can be accomplished by applying a continuous or discontinuous layer of a low-melt polymer to the substrate.

A particularly preferred substrate is wire insulation, particularly polyimide wire insulation. But the substrate can be almost any substrate, including a metal substrate, a polymer substrate, or more specifically a polyimide substrate. The substrate can be a flat surface or a curved or angled surface. In one embodiment, the substrate is an inflatable structure, preferably an inflatable polymer structure. In another embodiment, it is a solar cell.

Thus, one embodiment of the invention provides a method of repairing wire insulation comprising: (a) obtaining an electrical wire having a polyimide insulation layer and a continuous or discontinuous layer of a low-melt polymer outside of and in contact with the polyimide insulation; (b) heating the layer of a low-melt polymer to a first temperature effective to melt the low-melt polymer to spread it into cracks or deformations that may exist or have formed in the polyimide insulation; and (c) heating the layer of a low-melt polymer to a second temperature effective to cross-link the low-melt polymer and to repair the cracks or deformations in the polyimide insulation; wherein the low-melt polymer comprises a poly (amic acid) (PAA) or a polyimide.

Another embodiment provides a method of repairing a substrate comprising: (a) obtaining a substrate and a continuous or discontinuous layer of a low-melt polymer in contact with the substrate; and (b) heating the layer of a low-melt polymer to a first temperature effective to melt the low-melt polymer to spread it into cracks or deformations that may exist or have formed in the substrate; wherein the low-melt polymer comprises a polyimide comprising polyether or polysiloxane blocks.

Another embodiment provides a method of repairing wire insulation comprising: (a) obtaining an electrical wire having polyimide insulation layer and a continuous or discontinuous layer of a low-melt polymer in contact with the polyimide insulation; and (b) heating the layer of a low-melt polymer to a first temperature effective to melt the low-melt polymer to spread it into cracks or deformations that may exist or have formed in the polyimide insulation; wherein the low-melt polymer comprises a polyimide comprising polyether or polysiloxane blocks.

Another embodiment provides a wire insulation repair wrap comprising a poly(amic acid) (PAA) or a polyimide having reactive end groups, or a polyimide comprising polyether blocks or polysiloxane blocks; wherein the wrap is adapted to patch or surround an electrical wire having a layer of polyimide insulation, so as to repair damage to the insulation layer.

Another embodiment provides a wire comprising: (a) a metallic core electrical conductor; surrounded by (b) polyimide wire insulation layer; in contact with (c) a continuous or discontinuous layer of a low-melt polymer outside of and in contact with the polyimide insulation layer; wherein the low-melt polymer melts at a first temperature, and at a second temperature above the first temperature cures to form a hermetic seal with the polyimide insulation.

Polyimide resins are often brittle when applied as a coating onto a metallic surface. They have a high melting point or no melting point, so they tend to not flow at moderate temperatures to evenly coat an object. Polyimides and many other high-performance polymers have outstanding physical properties. Most of them have the potential to function as high-performance coatings. Indeed, polyimides have found use as copper wire enamel that coats wire used in electrical motor windings, solenoids, and the like. Most often however, these types of high-performance polymers are limited in their use as coatings because of their brittleness, poor solubility, and/or high melting points. One method of coating metal substrates that has gained great use in recent years is through the application of a powder coating. Such coatings are applied by preparing a powdered resin formulation and spraying it onto a metal surface. The coated substrate is then placed in an oven where the resin melts, flows, and cures to give a smooth uniform coating.

A typical polyimide is prepared by reacting equal molar amounts of two starting materials, i.e. a dianhydride and a diamine. These molecules react alternately with one another when mixed until a polymer with a molecular weight (MW) of several hundred thousand is produced. Such a polymer, by itself, is too high in MW to function well as a powdered coating. Average MWs of below 50,000, more preferably below 20,000, are needed for a resin to exhibit the needed melt and flow properties necessary to produce a good powder coating. But such low MW polymers are often too brittle to use as an effective coating.

The addition of end cap molecules to a polymer can function as polymerization chain terminators and thus produce resins that have molecular weights low enough to flow well and form good films applicable for use in powder coating applications. When cured, such low MW, low-melt polyimide resins containing reactive end caps can crosslink, forming higher molecular weight films which can eliminate the brittleness associated with lower molecular weight polymers.

Maleic anhydride is a preferred dual function chain terminator for use in this embodiment. Other terminators with a single reactive amine or anhydride group and an olefinic group for crosslinking, such as vinyl amine, allyl amine, allyl alcohol, acrylic acid, and methacrylic acid can also work.

Thus, one embodiment provides an article of manufacture comprising a metal layer coated with a coating comprising a polyimide; wherein the coating is formed by a process comprising: coating the metal with a low-melt polymer comprising reactive end caps, wherein the low-melt polymer is a polyimide or poly(amic acid) (PAA); and heating the low-melt polymer on the metal to initiate cross-linking on the metal to form a high-melt (i.e., nonflowable) polyimide coating.

Another embodiment provides a method of forming a polymer coating on a metal comprising: coating the metal with a low-melt polymer comprising olefinic organic acid end caps, wherein the low-melt polymer is a polyimide or poly(amic acid) (PAA); and heating the low-melt polymer on the metal to initiate cross-linking on the metal to form a high-melt polyimide coating.

Another embodiment provides a method of forming a polyimide film or poly(amic acid) (PAA) film comprising: (a) obtaining a solution of a PAA or polyimide in an organic solvent; (b) casting the solution on a non-stick surface (preferably selected from a polysiloxane and a perfluorinated alkane); (c) evaporating at least a portion of the organic solvent from the solution on the surface to form a PAA film or a polyimide film.

Another embodiment provides a low-melt polymer comprising olefinic organic acid end caps, having an average molecular weight below 50,000, more preferably below 20,000, and having a melting temperature range ending below 300° C., more preferably below 150° C., wherein the low-melt polymer is a polyimide or poly(amic acid) (PAA).

Presently, polyimides, particularly aromatic or predominantly aromatic polyimides, are used in creating tough, light weight, non-metallic mechanical parts such as ball bearings, sockets, and the like. Currently, such parts must be sintered or machined from blocks of solid polyimide. As a result, costs of preparing such parts from polyimide material are significant. Low-melt polyimide technology described in the present invention has the potential to alternatively allow such parts to be directly prepared via injection molding and other known processing techniques.

Thus, one embodiment of the invention provides a method of forming a molded article of manufacture comprising: (a) obtaining a polyimide having a melting temperature below 300° C. (more preferably below 150° C.); (b) melting the polyimide; (c) forming the melted polyimide into a desired shape by injection molding, extrusion molding, rotomolding, blow molding, or vacuum forming; (d) curing the polyimide in the desired shape into a higher melting temperature polyimide; and (e) cooling the cured polyimide in the desired shape. Another embodiment provides a molded article of manufacture formed by this method.

Another embodiment provides a method of forming a polyimide comprising: reacting a dianhydride and a diamine in a polymerization reaction mixture to form a PAA; wherein the dianhydride is a dianhydride of formula 1,

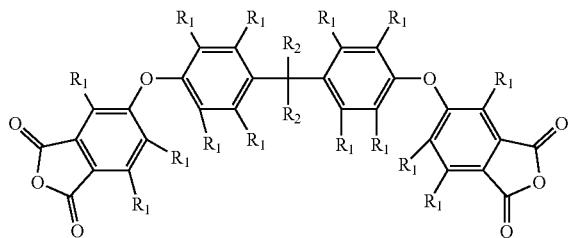

wherein each $R_1$ is independently H or $(C_1\text{-}C_4)$alkyl, and each $R_2$ is independently H or $(C_1\text{-}C_4)$alkyl or $CF_3$; or wherein the diamine is a diamine of formula 2 or 3:

$$H_2N\text{—}(C_2\text{-}C_6)\text{alkyl-}[O\text{—}(C_2\text{-}C_6)\text{alkyl-}]_nO\text{—}(C_2\text{-}C_6)\text{alkyl-}NH_2, \quad (2)$$

$$H_2N\text{—}(C_2\text{-}C_6)\text{alkyl-}O\text{—}Si(CH_3)_2\text{-}[O\text{—}Si(CH_3)_2\text{-}]_n O\text{—}Si(CH_3)_2\text{—}O\text{—}(C_2\text{-}C_6)\text{alkyl-}NH_2; \quad (3)$$

wherein at least 50% by weight of reactants in the polymerization reaction mixture are a compound of formula 1, 2, or 3 or a combination thereof. This forms a PAA. The method further comprises heating the PAA to imidize it to form a polyimide.

Another embodiment provides a polyimide produced by the method.

Another embodiment provides a method of forming a poly (amic acid) (PAA) comprising: reacting a dianhydride and a diamine in a polymerization reaction mixture to form a PAA; wherein the dianhydride is a dianhydride of formula 1,

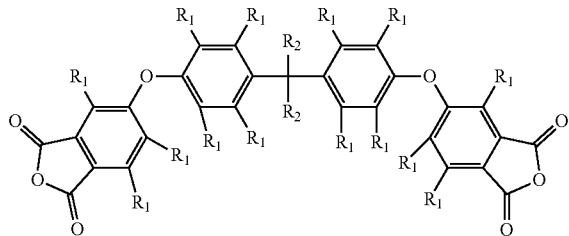

wherein each $R_1$ is independently H or $(C_1\text{-}C_4)$alkyl, and each $R_2$ is independently H or $(C_1\text{-}C_4)$alkyl, or $CF_3$;
or wherein the diamine is a diamine of formula 2 or 3

$$H_2N\text{—}(C_2\text{-}C_6)\text{alkyl-}[O\text{—}(C_2\text{-}C_6)\text{alkyl-}]_nO\text{—}(C_2\text{-}C_6)\text{alkyl-}NH_2 \quad (2)$$

$$H_2N\text{—}(C_2\text{-}C_6)\text{alkyl-}O\text{—}Si(CH_3)_2\text{-}[O\text{—}Si(CH_3)_2\text{-}]_n O\text{—}Si(CH_3)_2\text{—}O\text{—}(C_2\text{-}C_6)\text{alkyl-}NH_2; \quad (3)$$

wherein at least 50% by weight of reactants in the polymerization reaction mixture are a compound of formula 1, 2, or 3 or a combination thereof.

Another embodiment provides a PAA produced by the method.

Another embodiment provides an electrical heater apparatus for repairing wire insulation, the apparatus comprising: an upper heating element having a heating edge in the form of a semicircle; a lower heating element having a heating edge in the form of a semicircle; the upper and lower heating elements oppositely disposed and adapted to engage to surround and heat polymer insulation of an electrical wire; the upper and lower heating elements mechanically coupled through a hinge and each electrically coupled to an electrical power source device.

DETAILED DESCRIPTION OF THE INVENTION

Figure 1:
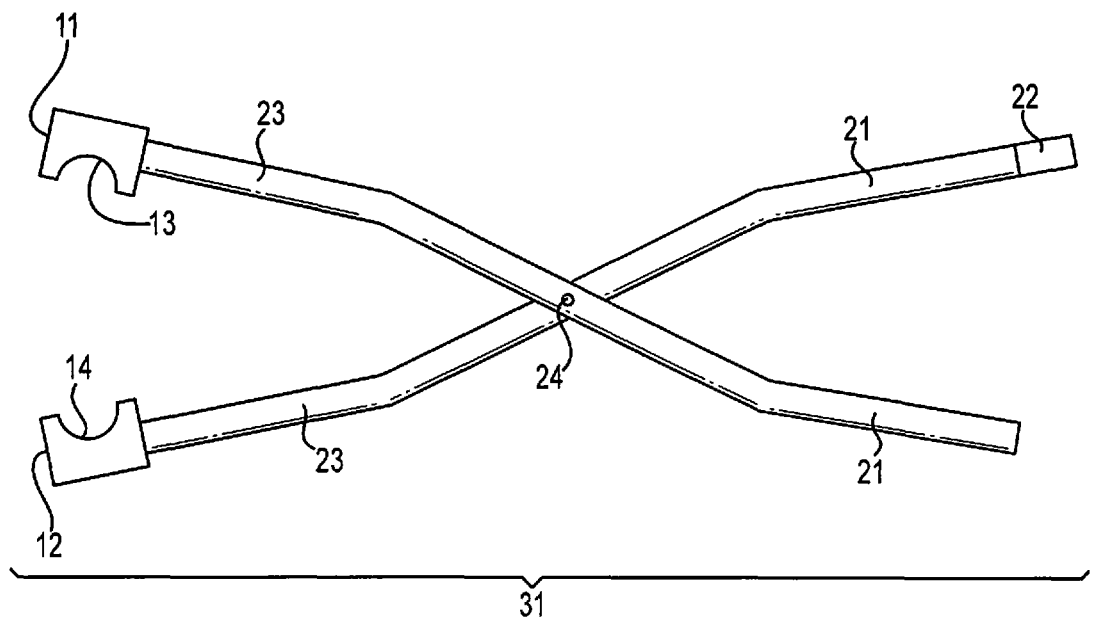
FIG. 1 is a side-view representation of an electrical heater apparatus for repairing wire insulation.
Figure 2:
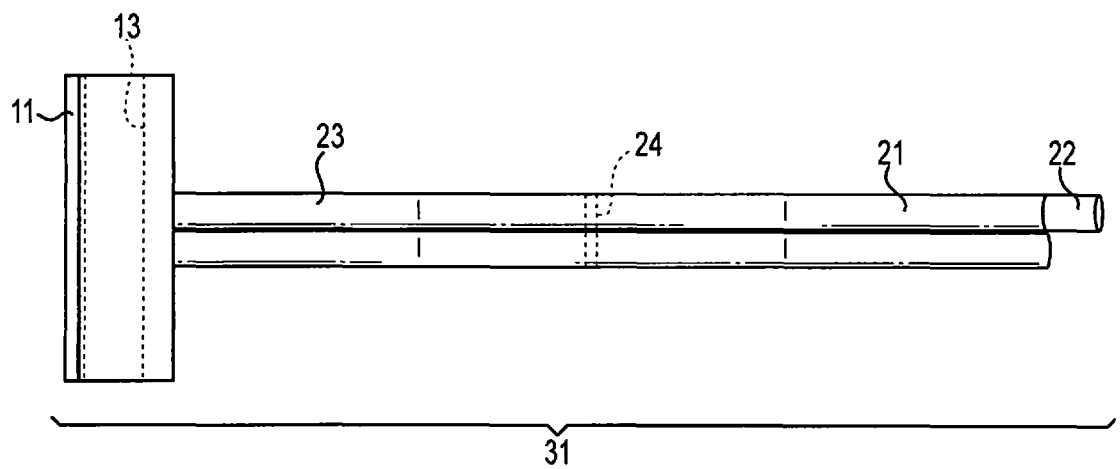
FIG. 2 is a top-view of the same electrical heater apparatus shown in FIG. 1.

The polyimide of polyimide wire insulation are of the formula below where R together with R' or R" or both form the polymer backbone. The polyimide of wire insulation is ordinarily an aromatic polyimide, i.e., a polyimide where R' and R" in the polyimide structure below are two carbon atoms of an aromatic ring.

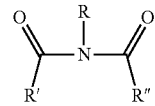

The PAAs are of the form below, where R and either R' or R" or both together form the polymer backbone. With heating, the PAAs can imidize to the corresponding polyimide (PI).

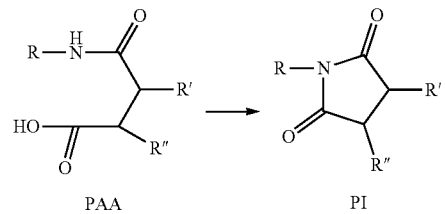

PAA    PI

It has been determined that when a solution of some poly (amic acids) (PAAs) dissolved in a solvent such as N-methylprrolidinone is applied to a substrate and subjected to temperatures that will cure the PAA precursor to a polyimide, the new polyimide film formed is intimately bonded to the original substrate. Thus, the PAA material is useful in the repair of damaged surfaces or substrates, particularly polyimide surfaces and polyimide wire insulation. Such PAAs can be applied to the compromised/damaged surface and heated to the melting point of the PAA, whereby the PAA melts and flows into intimate contact with the substrate. Subsequent heating to the cure temperature of the material produces a final repair that is firmly bonded to the damaged substrate, resulting in a superior repair due to the strong physical bonding obtained during the cure process to the underlying substrate.

A particularly preferred substrate is wire insulation, particularly polyimide wire insulation. But the substrate can be almost any substrate, including a metal substrate, a polymer substrate, or more specifically a polyimide substrate. The substrate can be a flat surface or a curved or angled surface. In one embodiment, the substrate is an inflatable structure, preferably an inflatable polymer structure. In one embodiment, the substrate is a solar panel.

The term "low-melt" polymer as used herein refers to a polymer that melts or flows at a low enough temperature to be useful in the particular embodiment. Preferably the low-melt polymer has a melting point below 300° C., more preferably below 250° C., more preferably below 200° C., and more preferably still below 150° C. A "high-melt" polymer has a melting temperature higher than the corresponding low-melt polymer. Most preferably, it has a melting temperature above 300° C. or no melting temperature (i.e., as the temperature is raised it decomposes rather than melts). In other embodiments, it may have a melting temperature above 200° C. or above 250° C.

Polyimide repair materials may be prepared by first synthesizing a poly(amic acid) (PAA). This PAA is heated to a temperature that transforms the PAA (imidizes it) into the polyimide. PAAs themselves do not have the physical properties that polyimides exhibit. But PAAs do tend to have lower softening/melting temperatures than polyimides. PAA precursors used to prepare polyimide wire insulation materials, i.e., KAPTON H, have melting temperatures still too high to be of use as repair materials. The present invention relates in part to the preparation of PAAs with significantly lower melting/softening temperatures. One way the inventors have found to achieve that is by mixing two or more PAAs together. The melting temperature of the resulting mixture is significantly lower than the melting point of the highest melting polymer component and often, due to melting point depression laws, lower than the melting temperature of both polymer components or all polymer components of the mixture.

Typically, the PAA mixture is prepared as detailed hereafter. The two PAAs chosen as components in the mixture are blended by mixing individual fluids containing the component PAAs or by mixing the individual solid PAAs with a given amount of suitable solvent such as N-methyprrolidinone (NMP). The newly created mixture is stirred at room temperature until all of the polymer has dissolved. This polymer solution can then be used to cast polymer films or to be processed to isolate the solid polymer mixture.

High-performance polyimide polymers used today in applications such as electrical wire insulation are prepared from aromatic monomer starting materials. Polyimides prepared from aliphatic monomers do not possess the same degree of excellent electrical, chemical, and thermal properties as their aromatic counterparts. Many PAA precursors prepared from aliphatic monomers do have, however, melting points far lower than those prepared from aromatic monomers. Two or more individual PAAs that are mixed produce polymers with acceptable physical properties while imparting greatly reduced melting points. Thus, PAAs with sufficiently low melting points that still polymerize to a polyimide with good physical properties for insulation—strength, flexibility, resistance to abrasion, and high or no melting temperature—can be produced in at least two ways: by mixing two or more PAAs and thereby producing a mixture that has a lower melting temperature than at least one of the PAAs, or by incorporating an appropriate blend of aliphatic and aromatic monomers in making a single PAA backbone. Increased aliphalicity of the monomers and the PAA gives the PAA a lower melting temperature.

The use of low melting/softening PAA polymer mixtures allows the fabrication of polyimide wire insulation repair materials that can be used to deliver an intimately bonded repair with the damaged substrate that will be far more secure, compact, and compatible with existing wire insulation as compared to conventional repairs. The repair material, after curing, will itself become a polyimide and as such will possess very similar properties as the damaged substrate to which it is applied.

A typical PAA terpolymer of the invention that combines an appropriate blend of aliphatic and aromatic monomers in a single backbone is prepared in the following manner. An aromatic diamine (or mixture of aliphatic and aromatic diamines) is dissolved into a suitable solvent such as N-methlpyrrolidinone (NMP). The mixture is held at room temperature and is stirred under nitrogen. An aromatic dianhydride (or mixture of aliphatic and aromatic dianhydride) is slowly added to the diamine mixture. An exothermic reaction ensues which is minimized by the slow addition or cooling. After the dianhydride has all been added, the mixture is allowed to stir for a number of hours to complete the polymerization. The newly created polymer solution can then be cast into polymer films or processed to isolate the solid polymer.

The repair low-melt polymers preferably form a tight seal with the substrate repaired, especially if the substrate repaired is a similar polymer, particularly a polyimide. The tight seal may be a hermetic seal. Where the substrate is a polymer, the seal may involve polymer chains of the repair polymer intermeshed with polymer chains of the substrate. It may in some embodiments involve forming covalent bonds between the repair polymer and the substrate, particularly a substrate polymer.

Polyether and Polysiloxane Moieties in the Polymers.

In another embodiment, the inventors have found that polyimides containing either siloxane or polyether chemistry, when used as repair materials for KAPTON type electrical wire insulation, have the potential to deliver superior repair properties over present repair materials. Poly(amic acids) having siloxane or polyether chemistry also have the same advantages.

Many physical properties have to be met in order for a polyimide wire insulation repair material to be effective. One of the properties needed is flexibility so that the repair material is easy to apply to the damaged substrate. Through the incorporation of polyether moieties or through the use of silicon in the form of siloxane chemistry as part of the backbone of poly(amic acids)s and polyimides it has been determined that films with increased flexibility can be obtained. Such films, because they are flexible, are much easier to handle and use as compared to conventional repair materials. Some of the films comprising the present invention have final polyimides that are also flexible and have relatively low melting points. It has been determined that these flexible polyimide films are adaptable for use as repair materials.

Using such films eliminates the "imidization" heating step that would otherwise be needed to complete the repair by coverting the PAA to a polyimide. Water is generated during imidization, and this water has the potential to interfere with the melting and bonding of the repair material to the damaged substrate. By using polyimides, rather than PAAs, as the repair material, the imidization step is eliminated, and better bonding to the damaged underlying original polyimide insulation may be achieved.

Cross-Linkable Polyimides.

Crosslinkable low-melt polyimides have the ability, at low temperatures, to melt, flow, and adhere to a substrate. The low-melt polyimide can then, under increased heat, undergo crosslinking which changes the repair material to a polymer which has similar thermal properties to the underlying damaged substrate.

One embodiment of the present invention is low-melt polyimides that are excellent in effecting a wire repair and still retain their fluidity at elevated temperatures. In order for a low-melt poly(amic acid) or polyimide to be an effective repair material, it must (after having been applied to the damaged substrate) melt, flow, and adhere well even when heated. This ensures intimate, permanent contact with the polyimide surface. The applied heat should preferably then cure the repair material to a cross-linked material with a much higher melting or softening point. This ensures that the repair will exhibit similar thermal properties as compared to the insulation substrate.

One embodiment is directed to low molecular weight, low-melt polyimide polymers with reactive end groups, which react when cured to form high molecular weight, high melting-point repairs. In accordance with the present invention, a list of such end groups may include, but is not limited to, anhydrides, carboxylic acids, esters, amines, alcohols, isocyanates, epoxides, olefins, dienes, and other moieties which can react via polymerization or other reaction pathways. It is important that the crosslinking portion of the repair process occur after the initial melting and flowing of the repair film. The repair film make-up should be so formulated to achieve this action.

Cross-linkable end groups can be incorporated into both PAAs and polyimides. Polyimides have two advantages, though. First, water of condensation is dramatically reduced or eliminated altogether upon heating, melting, and curing of polyimide films as opposed to poly(amic acid) films. Second, films from polyimides are durable and maintain their structure over time. Films of poly(amic acids)s are usually very brittle and of little use as repair materials unless they contain significant levels of solvent.

Modes of Use of the Repair Materials.

The repair materials disclosed herein can be formulated as single layers for use as patches or tape that can be manually applied to a damaged section of wire insulation or other surface. Suitable materials disclosed herein can also be a continuous outer or middle layer of original wire insulation or other surface. Alternatively, the wire can be manufactured with these materials as a continuous layer on or in the wire or other surface. If the wire or surface is later damaged, heat can be applied to cause the repair material to flow and spread into the damaged area and optionally to cure to a new polyimide that is permanently bonded to the damaged polyimide wire insulation or other surface. Thus, the low-melt polymer can be a continuous or discontinuous (i.e., tape or patch) layer of a wire or other surface, particularly a flat surface such as a flat or ribbon wire harness.

In the case of wires, past experience has shown that replacement of damaged wires is often very difficult to achieve and the repair materials do not have the same electrical properties as the initial, damaged insulation. Present repair techniques either wrap a mastic tape over the damaged wire insulation, or shrink wrap a low softening point TEFLON over the damaged area. Neither of these methods result in a permanent repair because of the inability to provide a close, intimate bond between the repair material and damaged polyimide insulation. The TEFLON insulation repair softens at a temperature that is significantly lower than the initial KAPTON type insulation. The thickness required for the TEFLON insulation is much greater than the thickness of the KAPTON type insulation which results in a bulky repair which can lead to further insulation breaks at each end of the repair.

In one embodiment, though, the materials of the invention can be used as one layer of a multi-layer (having two or more layers) tape or film or original wire insulation. The other layers can be conventional polyimide, TEFLON, or other suitable material.

The present invention overcomes the problems associated with known techniques as described here above. The present invention has developed low-melt polyimides (or PAAs) that can be used as an underlayer of a bi-layer repair film or as a middle layer in a tri-layer film. A bi-layer film may have an underlayer of the low-melt polymer. A tri-layer film may have the low-melt polymer as a middle layer. An initial repair made using this multi-layer repair film will have the ability to allow quick, easy, follow-up repairs should the need ever arise. For example, should a wire repaired with the multi-layer film created in accordance with the present invention later develop a crack or break at the previously repaired area, simple heating of this area would initiate the low-melt polyimide underlayer to melt and flow, thus repairing the crack.

In some embodiments, the low-melt polymer may be a viscous liquid at room temperature, particularly as a middle layer of a tri-layer film. This liquid has the ability to flow and fill any new breaks or cracks that might develop over the lifetime of the repaired area.

Endcapping Groups in Polyimides and Poly(Amic Acids).

Polyimide resins are often brittle when applied as a coating onto a metallic surface. We have found that the incorporation of maleic anhydride or other end cap groups into the resin reduces and possibly eliminates this undesirable condition.

Low-melt polyimides have the potential for successful use as powder coating resins. Due to the nature of the precursor poly(amic acids)s, and to some extent the polyimides created during the process, it is thought that such coatings could deliver exceptional corrosion resistance when used on metallic surfaces. Such coatings, however, must exhibit a number of important physical properties such as abrasion resistance, flexibility, adhesion, solvent resistance, etc. One such test is to evaluate the brittleness/adhesion capability of the resulting coating. This may be accomplished by applying the coating to a metal panel and then bending the panel to see if the coating cracks or delaminates from the surface of the panel. Many polyimides, when applied to a metal surface, have good adhesion characteristics, but easily crack when the coated metal panel is bent. It would be desirable to create a resin that exhibits sufficient flexibility in all circumstances. As will described below, the present invention provides such a material.

Maleic anhydride is a large volume organic raw material that finds use in a wide range of end products. It is useful in organic synthesis because of both its anhydride functionality as well as its easy ability to polymerize through its activated olefin. Low molecular weight (MW) PAA or polyimide resins can be made which exhibit excellent melt flow characteristics suitable for use as powder coating resins by using maleic anhydride as an "end capping" group.

A typical polyimide is prepared by reacting equal molar amounts of two starting materials i.e., a dianhydride and a diamine. These molecules react alternately with one another when mixed until a polymer with a MW of several hundred thousand is produced. Such a polymer, by itself, is too high in MW to function well as a powder coating. Average MWs of well below 50,000, preferably below 20,000 are needed for a resin to exhibit the needed melt and flow properties necessary to produce a good coating. End cap molecules such as maleic anhydride can function as chain termination molecules and produce resins that will form good films. However, such low MW resins do not result in films having sufficient flexibility. They are often brittle in nature. During the cure process a low-melt, low MW polyimide or poly(amic acid), end capped with maleic anhydride, can cross-link through the olefin group of the end cap. Such crosslinking increases the MW of the final coating, and we have found that the resulting coatings have improved flexibility compared to polyimide coatings without the presence of reactive end cap groups. Such crosslinked coatings do not delaminate or crack when the metal substrate is bent. We have found that they also have good scratch resistance and toughness.

Because of the "dual" nature or reactivity of maleic anhydride, two important needs can be met in the development of usable polyimide powder resins. The present invention allows the limiting of resin molecular weight for good melt flow and then allows the resin to regain its molecular weight which builds toughness and flexibility into the film.

Other end-cap groups that also have olefinic nature can be substituted for maleic acid, including allyl alcohol, vinyl amine, allyl amine, and acrylic acid, methacrylic acid, and the like.

Low-Melt Polyimides and PAAs for Injection Molding.

Presently, polyimides are used in creating tough, light weight, non-metallic sockets, ball bearings, and other mechanical parts. Currently, such parts must be sintered or machined from blocks of solid polyimide. As a result, costs of preparing such parts from polyimide material are significant. Low-melt polyimide technology described in the present invention has the potential to alternatively allow such parts to be directly prepared via injection molding and other known processing techniques. Such injection molding processes would greatly increase the number of applicable uses of such polyimides.

Polyimides are currently prepared by taking advantage of the reactivity of amines with anhydride chemical functionality. Thus, a diamine and dianhydride, when mixed in equal proportions, condense or polymerize into a high molecular weight polymer. When these building blocks are highly aromatic in nature, polyimides such as the commercial products KAPTON or UPILEX are created. These products have outstanding physical properties but are difficult to process. If the crystallinity of the polymer is reduced by using monomers with less aromaticity, the polymer can be made to have a lower melting point. KAPTON has virtually no melting point and simply decomposes at temperatures above approximately 500° C. With proper selection of dianhydride and diamine, polyimides with melting points below 300° C., and below 150° C. can be prepared. It is generally desirable that the end product generated by processing a low-melt polyimide be no longer processable or meltable. One method to achieve this is to introduce a curing mechanism of some sort into the polymer that allows the polymer to crosslink into a final product that can withstand high temperatures and still hold its shape. Such a curing mechanism can be incorporated into the polymer by "end capping" the polymer with a molecule such as maleic anhydride.

Non-Stick Surfaces for Processing Low-Melt Polyimides.

Non-stick surfaces can be used to aid in the processing of low-melt polyimide films.

Thin films, on the order of 1 to 10 mils thick, formed of low-melt polyimide are desirable for use in the repair of commercial polyimide or other high-performance polymer electrical wire insulations. Preparation of such films may be accomplished by casting a solvent solution of the low-melt polyimide onto glass, then allowing the solvent to evaporate before removing the film. A polyimide film may be removed from a glass surface via soaking in water. Certain types of low-melt polyimides have proven difficult to remove from glass surfaces and using a water soaking process could well result in long-term polymer hydrolysis effects. A different surface upon which to cast and prepare films is needed to effectively prepare and process low-melt polyimide films. As will become clear from the following description, the present invention provides a solution to the stated problem that is both unique and effective.

Glass surfaces are typically used to cast and prepare films of traditional polyimides. Low-melt polyimides, especially those containing siloxane chemistry in the backbone are very difficult to remove from glass. It has been found that certain commercial non-stick surfaces can be used in place of glass to aid in the preparation of these low-melt polyimide thin films. Such non-stick surfaces can be either pre-applied surfaces on metallic substrates, i.e., easily available examples such as non-stick bake ware, or consist of appliable coatings such as silicone or polytetrafluoroethylene (PTFE) sprays. Another type of non-stick surface exists in the form of heat-resistant silicone rubber mats. In general, all of these types of non-stick surfaces deliver improved film removal over the conventional glass substrate.

Because some low-melt polyimide films, especially those containing siloxane chemistry can only be removed from traditional substrates such as bare metal or glass with great difficulty, such films may only be removed using "skinning" techniques which often cause nicks and cuts as well as other defects in the film. Casting such films onto non-stick surfaces such as TEFLON results in poor wetting and a good film of consistent thickness cannot be formed. However, it has been discovered in the present invention that some easily available non-stick, commercial surfaces will allow good wet film formation and are sufficiently heat resistant to allow heat curing of the films once the solvent has evaporated. Representative of such non-stick surfaces are those used in coated non-stick bake ware. Non-stick silicone rubber mats also work well. Spray on films consisting of fine Teflon particles have also been found to work well.

Plasticizing Poly(Amic Acid) for Use as a Wire Repair Material.

High-performance polyimide materials may be utilized as insulation surrounding electrical wiring because of their excellent electrical properties, chemical resistance, and high heat performance. However, over time, this type of polyimide insulation may undergo slow degradation due to polymer chain hydrolysis breakdown initiated by the presence of water vapor. Replacement of damaged electrical insulation wires is very difficult and costly. Due to the chemical inertness of polyimide wire insulation, present repair techniques involve the wrapping of the damaged wire in multiple passes with tapes of materials such as TEFLON or other plastics and tying each end of the tape wrap to secure it in place. Another method for repairing damaged wire involves simply enclosing the damaged area with a low softening "clam-shell" shaped piece of repair polymer and "shrink-wrapping" the repair material onto the damaged area. Neither of these methods is considered hermetic or permanent in forming a close, intimate bond between the repair material and the damaged polyimide insulation and typically needs to be replaced over time.

In one embodiment of the present invention, polyimide insulation is prepared by first synthesizing a PAA. This PAA is heated to a temperature that transforms it into the polyimide. PAAs do not have the physical properties that polyimides exhibit. But one of the properties that PAAs have that might be advantageous with respect to insulation repair is the lower softening/melting temperatures of this class of polymer. The melting temperatures, however, of the PAA precursors of typical polyimide wire insulation materials, i.e., KAPTON H, have melting temperatures still too high to be of use as repair materials. As will be described below, this embodiment of the present invention is directed to the fabrication of chemically altered PAAs into thin films that exhibit melting temperatures sufficiently low enough such that good flow and adhesion to a polyimide substrate may occur before curing into a high-performance polyimide repair patch.

A PAA repair film formed in accordance with the present invention may be prepared in the following manner. The PAA is dissolved into a solvent such as N-methylopyrrolidinone (NMP), dimethylformamide (DMF), N,N, dimethylacetamide (DMAC), or dimethylsulfoxide (DMSO). Typically, the concentration of this solution is about 20 to 50% polymer in solvent. The polymer solution is then "cast" as a thin layer on a smooth substrate such as glass or a non-stick surface. This cast layer is allowed to dry to a point where the solvent content of the film is about 10 to 30% of the total film weight. The presence of the 10 to 30% solvent in the PAA polymer is considered optimal for allowing the easy removal of the film from the substrate and providing a "plasticizing" effect to the film.

Such plasticized films exhibit flexible properties making them easy to work with. They also melt and flow at lower temperatures than non-plasticized films. While some chemically altered PAAs have been developed that do not require solvent plasticization to yield repair materials with good flow and adhesion properties, the presence of solvent increases the range of potential commercial PAA repair material candidates and allows the use of materials that would otherwise be too brittle to form good flexible repair films.

Once a cast film formed in accordance with the present invention is removed from its substrate, it can be cut into the appropriate size, based on the area of wire insulation or other polymer surface in need of repair. The repair material is then applied to the surface area to be repaired and forced into intimate contact with the damaged insulation (or other surface) area by any one of a number of conventional techniques. The repair material is then heated slowly to a temperature well above the cure temperature of the PAA and held there until the PAA has melted to give a good, intimate contact with the substrate, subsequently curing into a polyimide repair surface. Such a repair material can also contain as part of its composition reactive end cap groups to provide additional crosslinking and cure.

The preparation of low melting/softening PAA polymers, with or without solvent, allows for the fabrication of polyimide wire insulation and other high-performance polymer surface repair materials that can be used to deliver an intimately bonded repair that will be far more secure, compact, and compatible with existing substrate chemistry. In the case of wire insulation repair, the use of incompatible "shrink-wrap" polymers or cumbersome clam shell repair techniques are replaced with a repair material and methodology of the present invention that applies a patch that will be far more intimately bonded and compatible with the wire insulation substrate. This repair material, after curing, will itself become a polyimide and as such will posses very similar physical prosperities as the substrate on which it is applied. It is expected that these results would also be realized in the repair of flat or ribbon wire harnesses used in such applications as electronic devices.

PAA Microparticles

One aspect of the present invention is the use of PAAs in the form of very small microparticles that exhibit melting temperatures low enough such that good flow and adhesion onto a polymer substrate can be achieved before curing into a high-performance polyimide repair patch.

PAA microparticles are prepared in accordance with the present invention by converting a PAA starting material into the ammonium salt of the amic acid using ammonium hydroxide solution. This PAA salt solution is now soluble in water. A mixture of higher boiling hydrocarbon such as light mineral oil or Stoddard Solvent, surfactant, and the aqueous ammonium salt is made. Through the use of a high speed blender, the resultant mixture is emulsified. The resulting emulsion, containing aqueous PAA micels (1 to 30 micron particle size) is dehydrated, leaving PAA microparticles suspended in solution. They can then be filtered or centrifuged to collect the particles. These particles can then be employed as a repair material in a number of well known techniques. One such technique is the suspension of the particles in a low boiling, but incompatible, media such as isopropyl alcohol to form a thick slurry. This slurry can then be "painted" onto the surface to be repaired. Evaporation of the solvent leaves the dry PAA behind as a thin layer. This can either be cured directly with a heat source or the powder layer can be coated or wrapped with a medium such as TEFLON tape and then subjected to heat cure.

The initial emulsive mixture to be mixed via blender may contain a specified amount of solvent that is compatible with the PAA, i.e., N-methylpyrrollidinone. This solvent will remain in the finished microparticle and help reduce the melting/softening point of the polymer when used as a repair. The repair material, after curing, will itself become a polyimide and as such will possess very similar physical properties to many polyimide substrates to which it may be applied.

Thus, in one aspect of the invention, the PAA is PAA ammonium salt. In another aspect, the PAA is in microparticles. The microparticles may include a compatible solvent.

Device for Heating Polymer Repair Layers.

Low-melt polyimides and PAAs in accordance with the present invention can be processed into thin films that work well in the repair of high-performance polymer insulated electrical wiring. Such films can be used in wire insulation repairs by affixing a film of PAA or low-melt polyimide formed in accordance with the present invention to the damaged wire and heating the film to effect melt, flow, and cure of the film. The heating of the repair film can be accomplished with the use of a heating device based on an electrical soldering iron that has been specifically modified in shape to include a special head or tip that has been fabricated with a groove that can accommodate the size of wire being repaired, see drawing. The tip has top and bottom segments each with half circle grooves that can "clamp" together to completely surround the wire and repair film. The method of repair can be simplified for the repair technician by providing replaceable or disposable soldering iron heads which have repair film already "loaded" and ready for use. The soldering iron heating device of the present invention can be equipped with a battery-powered supply that allows its use in areas where plug-in current is not available.

A device of the invention is shown in FIG. 1. It shows an electrical heater apparatus 31 for repairing wire insulation according to the methods of the invention. The apparatus comprises an upper heating element 11 having a heating edge 13 in the form of a semicircle and a lower heating element 12 having a heating edge 14 in the form of a semicircle. The upper and lower heating elements are oppositely disposed and adapted to engage to surround and heat polymer insulation of an electrical wire. The upper and lower heating elements 11 and 12 are mechanically coupled through arms 23 and hinge 24. The device as shown also includes handles 21. The upper and lower heating elements 11 and 12 are each electrically coupled to an electrical power source device 22. The power source 22 may be a battery or a plug for an electrical outlet.

One embodiment of the invention provides a method of repairing wire insulation comprising: (a) obtaining an electrical wire having a polyimide insulation layer and a continuous or discontinuous layer of a low-melt polymer outside of and in contact with the polyimide insulation; (b) heating the layer of a low-melt polymer to a first temperature effective to melt the low-melt polymer to spread it into cracks or deformations that may exist or have formed in the polyimide insulation; and (c) heating the layer of a low-melt polymer to a second temperature effective to cross-link the low-melt polymer and to repair the cracks or deformations in the polyimide insulation; wherein the low-melt polymer comprises a poly (amic acid) (PAA) or a polyimide.

In this method and other embodiments of the invention, the wire has an original polyimide insulation layer that is repaired. In other embodiments, the original insulation layer may be other polymers.

In particular embodiments, the low-melt polymer comprises a PAA, wherein the second temperature is effective to convert the PAA into a repair polyimide layer and form an intimate bond (a tight seal) between the repair polyimide layer and the polyimide insulation. The intimate bond may involve covalent bonds between the repair polyimide layer and the polyimide insulation.

In specific embodiments, the low-melt polymer comprises a polyimide with reactive end groups, wherein at the second temperature the polyimide with reactive end groups reacts through its reactive end groups to form a repair polyimide. The end groups may also react with the polymer substrate so the repair polyimide is covalently bonded to the polymer substrate. The reactive end groups in specific embodiments are olefinic groups. In specific embodiments, the reactive end groups are olefinic organic acid end caps, for example maleic acid end caps resulting from reacting with maleic anhydride. In specific embodiments, the reactive end groups are groups resulting from end-capping reactions with acrylic acid (forming an acrylic acid salt with amino or other positively charged groups on the polymer), methacrylic acid, allyl alcohol, allyl amine, vinyl amine, or maleic anhydride.

In specific embodiments of the methods and materials and articles disclosed herein, the low-melt polymer or low-melt polymer layer comprises a mixture of at least two PAAs or at least two polyimides.

In specific embodiments, the mixture of two PAAs or at least two polyimides melts at a lower temperature than at least two of the at least two PAAs or polyimides.

In particular embodiments, the low-melt polymer comprises a PAA or a polyimide having reactive end groups, or a polyimide comprising polyether blocks or polysiloxane blocks in the polymer backbone.

The PAA in specific embodiments also has reactive end groups.

In specific embodiments, the PAA comprises polyether or polysiloxane blocks.

Where the PAA or polyimide comprises polyether blocks, the polyether blocks in specific embodiments have the structure —($C_2$-$C_6$)alkyl-[O—($C_2$-$C_6$)alkyl-]$_n$O—($C_2$-$C_6$)alkyl-. In other embodiments, the polyether blocks have the structure —($C_4$-$C_6$)alkyl-[O—($C_4$-$C_6$)alkyl-]$_n$O—($C_4$-$C_6$)alkyl-. In specific embodiments, the polymer is formed by reacting a diamine and a dianhydride, where the diamine has the structure $H_2N$—($C_2$-$C_6$)alkyl-[O—($C_2$-$C_6$)alkyl-]$_n$O—($C_2$-$C_6$) alkyl-$NH_2$. In other embodiments, the diamine has the structure $H_2N$—($C_4$-$C_6$)alkyl-[O—($C_4$-$C_6$)alkyl-]$_n$O—($C_4$-$C_6$) alkyl-$NH_2$.

Where the PAA or polyimide contains polysiloxane blocks, the polysiloxane blocks in specific embodiments have the structure —($C_2$-$C_6$)alkyl-O—Si($CH_3$)$_2$—[O—Si($CH_3$)$_2$-]$_n$O—Si($CH_3$)$_2$—O—($C_2$-$C_6$)alkyl-. In specific embodiments, the polymer is formed by reacting a diamine and a dianhydride, where the diamine has the structure $H_2N$—($C_2$-$C_6$)alkyl-O—Si($CH_3$)$_2$[O—Si($CH_3$)$_2$-]$_n$O—Si($CH_3$)$_2$—O—($C_2$-$C_6$)alkyl-$NH_2$.

In specific embodiments, 15% to 60% of the carbon atoms of the low-melt polymer are in polyether or polysiloxane blocks.

In specific embodiments, the PAA mixture is formed by a process comprising: dissolving the at least two PAAs into a compatible solvent to form a PAA solution; and evaporating at least some of the solvent to form a solidified PAA mixture.

In specific embodiments, the polyimide mixture is formed by a process comprising: dissolving the at least two polyimides into a compatible solvent to form a polyimide solution; and evaporating at least some of the solvent to form a solidified polyimide mixture.

In specific embodiments, the low-melt polymer is formed from a reaction mixture of monomers, wherein at least 15% by weight of the monomers are fully aliphatic, defined herein as not aromatic.

In specific embodiments, at least 15% of carbon atoms in the low-melt polymer are aliphatic carbon atoms (defined herein as not being a ring carbon of an aromatic ring). In other specific embodiments, 15% to 60% of carbon atoms in the low-melt polymer are aliphatic.

In specific embodiments of the methods, articles, and materials of the invention, the first temperature effective to melt the low-melt polymer, is 70° C. to 170° C. In other embodiments, the first temperature is 70° C. to 150° C. In other embodiments, the first temperature is 70° C. to 300° C. In specific embodiments, the low-melt polymer has a melting temperature of 70° C. to 170° C. In other embodiments, the low-melt polymer has a melting temperature of 70° C. to 150° C. In specific embodiments, the low-melt polymer has a melting temperature of 70° C. to 300° C.

In specific embodiments, the second temperature effective to cross-link the low-melt polymer is 120° C. to 300° C., more preferably 120° C. to 250° C. In other embodiments it is 130° C. to 250° C. or 150° C. to 250° C. In specific embodiments, the temperature effective to cure or cross-link the low-melt polymer is 120° C. to 250° C. In other embodiments it is 150° C. to 250° C.

In specific embodiments, the second temperature is effective to cure the low-melt polymer and form a polyimide with no melt temperature or a melt temperature higher than its cure temperature. By "cure" it is meant that the polyimide crosslinks.

In specific embodiments, the low-melt polymer layer comprises a cross-linker. The cross-linker may be a reactive end-cap group that is part of the polymer, or it may be a separate compound mixed with the low-melt polymer in the low-melt polymer layer. In specific embodiments, the cross-linker is acrylic acid, methacrylic acid, allyl alcohol, allyl amine, vinyl amine, or maleic anhydride.

In specific embodiments of the low-melt polymers having reactive end groups, the reactive end groups are selected from the group consisting of anhydrides, carboxylic acids, esters, amines, alcohols, isocyanates, epoxides, olefins, and dienes.

In specific embodiments of low-melt polymers with reactive end cap groups, the reactive end cap groups may be olefinic end cap groups. In more specific embodiments, they are olefinic organic acid end cap groups, e.g., maleic acid groups produced by reaction of maleic anhydride.

In specific embodiments, the low-melt polymer comprises olefinic organic acid end caps formed by including an acid anhydride comprising an olefin group in a polymerization reaction to form the low-melt polyimide or PAA.

In specific embodiments of the methods, materials, and apparatuses disclosed herein, the low-melt polymer has an average molecule weight below 50,000, more preferably below 20,000. In specific embodiments, the high-melt polyimide (formed from the low-melt polymer) has an average molecular weight above 200,000.

One embodiment provided is a method of forming polyimide films comprising: (a) obtaining a solution of a polyimide in an organic solvent; (b) casting the solution on a non-stick surface selected from a polysiloxane and a perfluorinated alkane; (c) evaporating at least a portion of the organic solvent from the solution on the surface to form a polyimide film.

In a more specific embodiment of this method, the solution is formed by dissolving a dianhydride and a diamine in the organic solvent, and reacting the dianhydride and diamine in the organic solvent to form a PAA and heating the PAA to form the polyimide.

In specific embodiments of the methods of repairing wire insulation, at least one of the heating steps comprises heating the low-melt polymer layer with the electrical heater apparatus described herein.

One embodiment of the invention provides a method of forming a poly(amic acid) (PAA) or a polyimide comprising: reacting a dianhydride and a diamine in a polymerization reaction mixture to form a poly(amic acid); wherein the dianhydride is a dianhydride of formula 1,

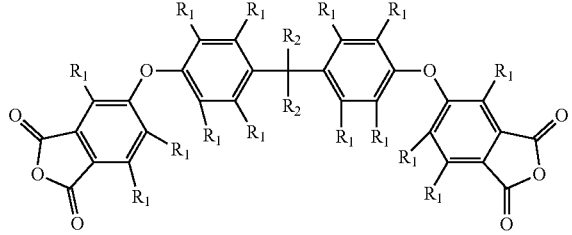

(1)

wherein each $R_1$ is independently H or $(C_1\text{-}C_4)$alkyl, and each $R_2$ is independently H or $(C_1\text{-}C_4)$alkyl;

or wherein the diamine is a diamine of formula 2 or 3

$$H_2N\text{---}(C_2\text{-}C_6)\text{alkyl-[O---}(C_2\text{-}C_6)\text{alkyl-]}_nO\text{---}(C_2\text{-}C_6)\text{alkyl-}NH_2 \quad (2)$$

$$H_2N\text{---}(C_2\text{-}C_6)\text{alkyl-O---}Si(CH_3)_2[O\text{---}Si(CH_3)_2\text{-]}_n$$
$$O\text{---}Si(CH_3)_2\text{---}O\text{---}(C_2\text{-}C_6)\text{alkyl-}NH_2; \quad (3)$$

wherein at least 50% by weight of reactants in the polymerization reaction mixture are a compound of formula 1, 2, or 3 or a combination thereof.

In a specific embodiment, the compound of formula 1 is bisphenol A dianhydride, where each of the $R_1$'s is hydrogen and each of the $R_2$'s is methyl (see Example 1 below).

In a specific embodiment, the compound of formula 2 is XTJ-452 (see Example 1 below).

In a specific embodiment, the compound of formula 3 is diaminopolysiloxane (see Example 1 below).

In a preferred embodiment, the dianhydride is a compound of formula 1 and the diamine is a diamine of formula 2 or 3.

In specific embodiments, at least 60%, at least 70% or at least 80% of reactants in the polymerization reaction mixture are a compound of formula 1, 2, or 3 or a combination thereof.

Figure 3:
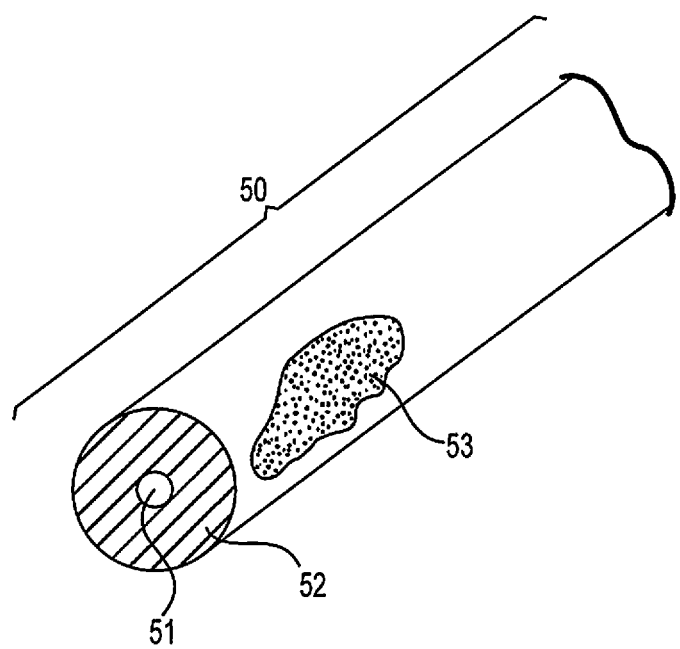
FIG. 3 shows a wire of the invention comprising a metallic core electrical conductor surrounded by a polyimide wire insulation layer in contact with a continuous or discontinuous layer of a low-melt polymer outside of and in contact with the polyimide insulation layer.

FIG. 3 shows a drawing of a wire 50 comprising: a metallic core electrical conductor 51; surrounded by a polyimide wire insulation layer 52; in contact with 53 a continuous or discontinuous layer 53 of a low-melt polymer outside of and in contact with the polyimide insulation layer. In FIG. 3 the layer of a low-melt polymer is shown as a discontinuous layer 53, i.e., a patch. The low-melt polymer layer 53 is adapted to melt at a first temperature, and at a second temperature above the first temperature cure to form a hermetic seal with the polyimide insulation.

The embodiments of the invention will now be illustrated by the following non-limiting examples. The examples are intended to illustrate the invention but not limit its scope.

EXAMPLES

Example 1

Poly(amic acids) (PAAs) and polyimides were prepared by a polymerization reaction of a dianhydride and a diamine. The polymerization reaction initially forms a PAA. The PAA can be converted to the corresponding polyimide by heating to 150° C. In several cases, the reaction also included an end capping cross-linker.

Examples of dianhydrides found useful were bisphenol A dianhdyride and B-4400:

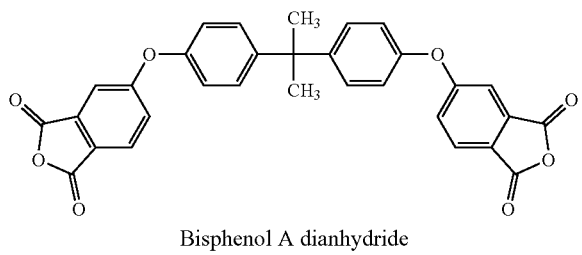

Bisphenol A dianhydride
BPADA

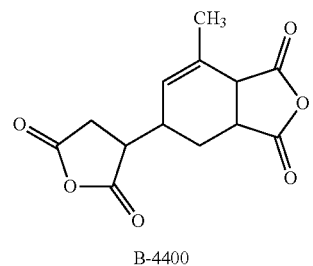

B-4400

Diamines evaluated and found most useful in the invention included the aliphatic diamines DAD, XTJ-452, and DAPS, and the aromatic diamine ODA:

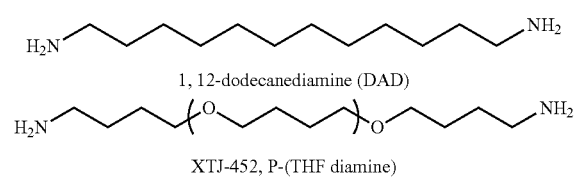

1, 12-dodecanediamine (DAD)

XTJ-452, P-(THF diamine)

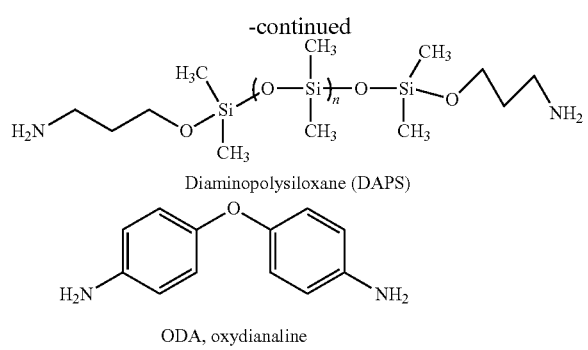

Diaminopolysiloxane (DAPS)

ODA, oxydianaline

The cross-linker tested was maleic anhydride. Acrylic acid, methacrylic acid, allyl alcohol, allyl amine, and vinyl amine are other useful crosslinkers.

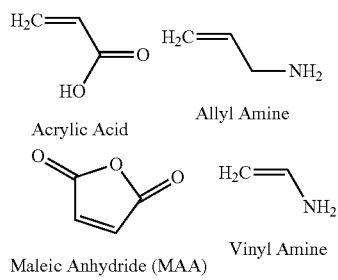

Acrylic Acid

Allyl Amine

Maleic Anhydride (MAA)

Vinyl Amine

Several formulations which have undergone extensive evaluations include those produced from the following reaction mixtures:

BPADA/DAPS/ODA/MAA $(9:8:2:2)_m$ (SPIF)
BPADA/XTJ-542/ODA/MAA $(4:2:3:2)_m$
BPADA/XTJ-542/DAPS/ODA/MAA $(4:2:1:2:2)_m$
BPADA/XTJ-542/diaminodisiloxane/ODA/MAA $(5:2:2:2:2)_m$ Example 2

Laboratory Preparations of Low-Melt Polyimides and PAAs 1. 70 ml of NMP solvent and 8.75 g diaminododecane (DAD) were mixed in a 200 ml, three necked round bottom flask fitted with a N2 inlet, thermocouple, and stopper. This amine mixture was heated to 70° C. in order to melt and dissolve the amine. The solution was cooled to 55° C. after which 26.0 g of BPADA flake were added to the stirring amine solution. Rapid stirring was needed to keep the anhydride flake from clumping together during the early part of the reaction. An exotherm of 20° C. to 75° C. was noted. The temperature and stirring of the reaction mixture was maintained at 40° C. for 18 hrs. after which the solution was filtered through a paper filter to remove any insoluble debris. The final product is a viscous, amber liquid containing approximately 33% poly(amic acid).

2. 50 ml of N-methylpyrrolidone solvent (NMP), 3.60 g (0.018 mole) of oxydianiline (ODA), and 24.96 g (0.024 mole) of XTJ-542 polyether diamine were mixed in a 200 ml, three necked round bottom flask fitted with a N2 inlet, thermocouple, and stopper. This amine mixture was stirred at room temperature (22° C.) and was accomplished via a large magnetic stir bar. 18.72 g (0.036 mole) of bisphenol A dianhydride (BPADA) and 1.96 g (0.012 mole) of maleic anhydride were weighed out and combined as solids, then added to the stirring amine solution in one quick portion. An exotherm temperature increase to 52° C. was noted during the initial stage of this reaction with an accompanying viscosity increase. The temperature and stirring of the reaction mixture was maintained at 40° C. for 18 hours after which the solution was filtered through a paper filter to remove any insoluble debris. The final product is a viscous, amber colored liquid containing approximately 50% of the desired poly(amic acid).

3. 70 ml of chlorobenzene and 20 ml of dimethylformamide (DMF) were combined as a solvent in a 200 ml, three necked round bottom flask fitted with a N2 inlet, thermocouple, and stopper. At a temperature of 40° C. diaminopolysiloxane (32.7 g; 0.0355 mole) (DAPS) and 1.78 g (0.0089 mole) of ODA were charged to this solvent mixture and stirred until the ODA had all dissolved. BPADA flake (20.8 g; 0.04 mole) and maleic anhydride (0.87 g; 0.0089 mole) were combined and then added in one portion to the stirring amine solution. An exotherm of 6° C. to 46° C. was observed. The temperature and stirring of the reaction mixture was maintained at 40° C. for 18 hours, after which the solution was filtered through a paper filter to remove any insoluble debris. The final product is a viscous, amber colored liquid containing 37% of the desired poly(amic acid).

Poly(amic acid) solutions were used to prepare polyimide films. In a typical film preparation procedure a quantity of the poly(amic acid) solution was applied to either a glass plate or a silicone rubber mat and spread into a thin, uniform film via the use of a doctor blade. The substrate/wet film was allowed to dry for 16-24 hours and then placed in an oven at 150° C. for 60 minutes to fully evaporate the solvent present and effect the imidization of the polymer. Films thus produced were used in various manual repair procedures of simulated damage to surfaces such as electrical wire insulation and other flexible high-performance polymer surfaces such as inflatable structures.

Poly(amic acids) (PAAs) evaluated as powder coatings were prepared by precipitating the solid polymer from NMP or DMF solution. This can be done by pouring the PAA solution into rapidly stirring water and then collecting and drying the solid polymer. The PAA is evaluated as a powder coating by mixing it with other additives (flow and leveling aids, pigments, etc.) and then heated to the melting point of the resin. The molten mixture is then mixed to homogenize the mixture. This new powder coating formulation is then ground into a powder suitable for application via traditional powder coating spraying techniques.

Low-melt polyimides desired for use in extrusion and molding applications were precipitated from solution as polyimides rather than poly(amic acids). The precipitated polyimide was collected and dried thouroughly before use.

Preferred low-melt polyimides employ the use of one or both of these two diamines in combination with an aromatic diamine such as ODA to provide a useful balance of electrical resistance, flexibility, solvent resistance, and low flammability. Film flexibility and meltability deteriorate significantly if the mole ratio of aromatic to non-aromatic diamine is greater than 1. Thus, useful repair films contained more non-aromatic diamine than aromatic diamine on a mole basis.

Chemical Sources
BPADA—ChrisKey Chemical
XTJ-542 (and other similar polyetherdiamines)—Huntsman Chemical DAD—DuPont Chemical
ODA, Maleic Anhydride, and solvents—Aldrich Chemical
DAPS (and other similar siloxane diamines)—Gelest Chemical

We claim:

1. A method of forming a polyimide comprising:
   reacting a dianhydride and a diamine with an olefinic cross-linker in a polymerization reaction mixture to form a poly(amic acid) (PAA); and
   heating the PAA to form a polyimide;
   wherein (a) the dianhydride is a dianhydride of formula 1,

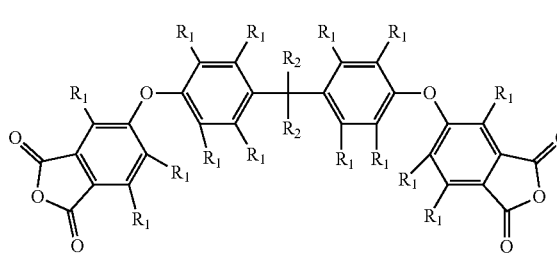

wherein each $R_1$ is independently H or $(C_1\text{-}C_4)$alkyl, and each $R_2$ is independently H or $(C_1\text{-}C_4)$alkyl or $CF_3$;
or (b) the diamine is a diamine of formula 2 or 3

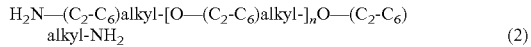

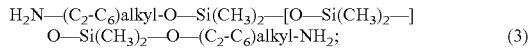

wherein at least 50% by weight of reactants in the polymerization reaction mixture are a compound of formula 1, 2, or 3 or a combination thereof;
wherein the method comprises reacting the diamine and dianhydride in the reaction mixture at less than 100° C. to form a PAA in solution, casting the PAA solution into a film on a substrate, and then heating the film to imidize the PAA to a polyimide.

2. The method of claim 1 wherein the dianhydride is a compound of formula 1 and the diamine is a diamine of formula 2 or 3.

3. The method of claim 2 wherein the compound of formula 1 is bisphenol A dianhydride.

4. The method of claim 2 wherein at least 60% of reactants in the polymerization reaction mixture are a compound of formula 1, 2, or 3 or a combination thereof.

5. The method of claim 1 wherein the diamine is a compound of formula 2.

6. The method of claim 1 wherein the diamine is a compound of formula 3.

7. The method of claim 1 wherein the olefinic cross-linker is selected from the group consisting of acrylic acid, methacrylic acid, allyl alcohol, allyl amine, maleic anhydride, and vinyl amine.

8. The method of claim 7 wherein the olefinic cross-linker is maleic anhydride.

9. A polyimide formed by the process of claim 1.

10. The method of claim 1 wherein the method comprises reacting the diamine and dianhydride with an olefinic cross-linker to form a PAA with olefinic end groups or polyimide with olefinic acid end groups, and then heating the PAA with olefinic end groups or polyimide with olefinic end groups to form a polyimide cross-linked through the olefinic end groups.

11. A method of forming a polyimide comprising:
    reacting a dianhydride and a diamine and an olefinic cross-linker in a polymerization reaction mixture, wherein the dianhydride and diamine are in about equimolar amounts, to form a poly(amic acid) (PAA) with olefinic end groups; and
    heating the PAA to form a polyimide with olefinic end groups;
    wherein (a) the dianhydride is a dianhydride of formula 1,

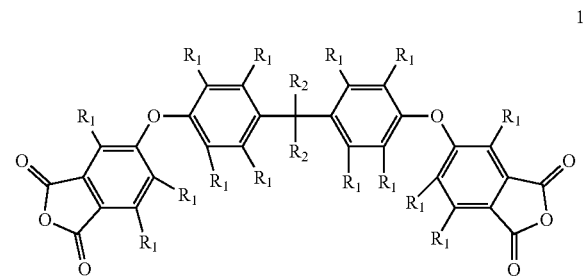

wherein each $R_1$ is independently H or $(C_1\text{-}C_4)$alkyl, and each $R_2$ is independently H or $(C_1\text{-}C_4)$alkyl or $CF_3$;
or (b) the diamine is a diamine of formula 2 or 3

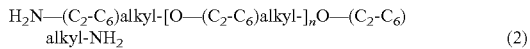

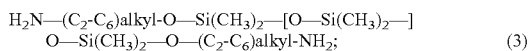

wherein at least 50% by weight of reactants in the polymerization reaction mixture are a compound of formula 1, 2, or 3 or a combination thereof;
wherein the polyimide has a melting temperature of 70° C. to 170° C.

12. The method of claim 11 wherein the method further comprises heating the polyimide with olefinic end groups and a melting temperature of 70° C. to 170° C. to form a polyimide cross-linked through the olefinic end groups, wherein the polyimide cross-linked through the olefinic end groups has a melting temperature above 300° C.

13. The method of claim 11 wherein the olefinic cross-linker is selected from the group consisting of acrylic acid, methacrylic acid, allyl alcohol, allyl amine, maleic anhydride, and vinyl amine.

14. The method of claim 13 wherein the olefinic cross-linker is maleic anhydride.

15. The method of claim 11 wherein the method comprises reacting the diamine and dianhydride and olefinic cross-linker in the reaction mixture at less than 100° C. to form a PAA in solution, casting the PAA solution into a film on a substrate, and then heating the film to imidize the PAA to a polyimide.

16. The method of claim 11 wherein the dianhydride is a dianhydride of formula 1 and the diamine is a diamine of formula 2 or 3.

17. The method of claim 11 wherein the diamine is a diamine of formula 3.

18. The method of claim 11 wherein the dianhydride of formula 1 is bisphenol A dianhdride and the diamine is a diamine of formula 2 or 3.

* * * * *